Oct. 24, 1939.   O. VON DACHENHAUSEN   2,177,314
ORNAMENT ENSEMBLE
Filed Aug. 19, 1937
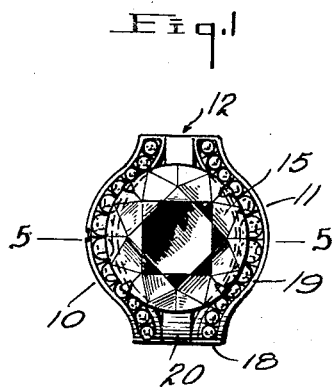
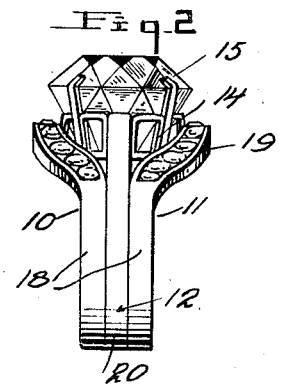
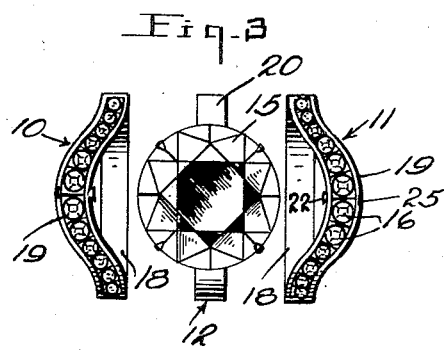
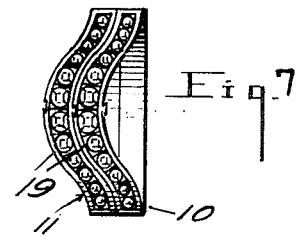
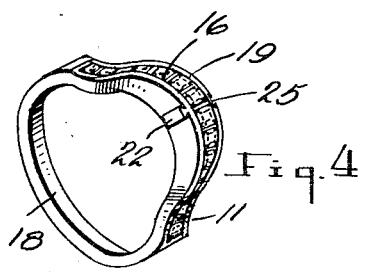
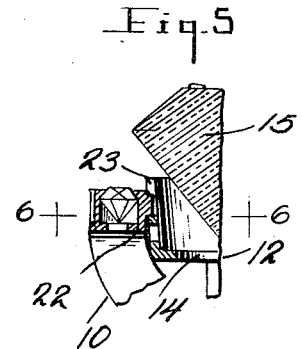
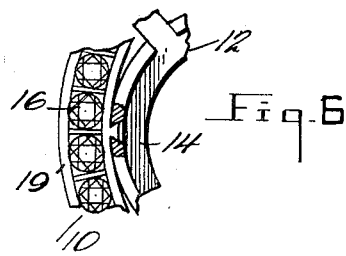
Inventor
Olive von Dachenhausen
By Watson, Coit, Morse & Grindle
Attorneys Patented Oct. 24, 1939

2,177,314

UNITED STATES PATENT OFFICE 2,177,314

ORNAMENT ENSEMBLE

Olive von Dachenhausen, Los Angeles, Calif.

Application August 19, 1937, Serial No. 159,931

1 Claim. (Cl. 63—15)

This invention relates to ornaments such as rings or bracelets and is particularly concerned with ornament ensembles comprising two or more members which are so formed as to promote the comfort of the wearer and improve the appearance of the ensemble and of each of the several members thereof.

The invention is especially applicable to ornament ensembles of which at least one member is provided with an enlarged portion, ornamentation, or stone mounting. It is the principal object of the invention to form the contiguous member or members of the ensemble of such shape and configuration that such enlarged portion or mounting will neither obscure the adjacent member nor cause the shanks of the several members to be spaced or canted. The desired result is achieved by constructing such adjacent members to conform generally to the lateral configuration of the member having the enlarged portion. Thus, in the application of the invention to a finger ring ensemble of which one member is provided with a stone mounting, the other ring member or members may be curved laterally at the outer side thereof to partially surround and follow the contour of the stone mounting, permitting the shank portions of the members to lie in close juxtaposition in parallel planes.

The several members of the ensemble may, if desired, be provided with cooperating means for preventing relative rotation or axial displacement thereof, so as to maintain such members in their intended relation and in order that the ensemble may constitute a more or less rigid unit.

It is a feature of the invention that in an ensemble composed of three members, any one of the members may be dispensed with and the remaining two worn with pleasing effect.

Further objects and features of the invention will be apparent from the following description, taken in connection with the accompanying drawing, in which Figure 1 is a plan view illustrating the application of the invention to a finger ring ensemble having three members, showing the several members thereof in assembled relation;

Figure 2 is a side elevation of the ensemble shown in Figure 1;

Figure 3 is a plan view of the ensemble, the several members thereof being shown in axially spaced relation;

Figure 4 is a perspective view of one member of the ensemble;

Figure 5 is a fragmentary sectional view taken substantially on the line 5—5 of Figure 1;

Figure 6 is a fragmentary sectional view taken substantially on the line 6—6 of Figure 5; and Figure 7 is a plan view illustrating the manner in which two members of the ensemble may be worn without the third.

Referring more particularly to the drawing, it will be observed that the invention is illustrated as applied to a finger ring ensemble composed of three members indicated at 10, 11, and 12, the central member being provided with a stone setting 14 supporting a single large stone 15 in the conventional manner. The adjacent members 11 and 12 are represented as provided at their upper sides with a series of smaller stones 16, but may be otherwise ornamented or left entirely plain. Each of the members 11 and 12 is so formed that the shank portion 18 thereof is disposed throughout its entirety in a single plane, the upper or crown portion 19 being of arcuate configuration as viewed in plan, curving laterally immediately adjacent the setting 14 and stone 15 of the central member so as to partially surround and conform closely to the outline of the latter when associated therewith, permitting the shank portions 18 of the members 11 and 12 to lie in face to face contact with the shank portion 20 of the central member 10. It will be observed that the arrangement is such as to avoid any substantial or undesirable obscuring of the ornamented portions of the members 11 and 12 by the stone 15 of the central member 10, and the effect of displaying rather than concealing such ornamented portions is to increase the apparent size of the stone 15 and enhance the attractive appearance thereof, as may be readily observed from a comparison of Figures 1 and 3 of the drawing. Since the shank portions 18 and 20 of the several members may fit snugly against one another, these members do not tend to separate or cant when assembled on the finger and the close conformity of the members throughout prevents the fleshy part of the finger from protruding therebetween with resultant discomfort to the wearer.

Owing to the conforming shape of the several members of the ensemble, the members are not likely to rotate when assembled in interfitting relation, particularly in the case of the finger ring ensemble. Nevertheless, it may prove desirable to provide some interlocking means between the members to positively prevent either relative rotation or axial displacement or both, and one such construction has been illustrated in Figures 4 to 6. Thus each of the members 11 and 12 may be provided at one side of the upper portion 19 thereof with a small projection 22 of dovetailed shape as viewed in plan, these projections being adapted for reception in a correspondingly shaped slot 23 in the setting or crown 14 of the member 12. It will be appreciated that by sliding either of the members 11 and 12 past the adjacent face of the member 10 to cause the projection 22 to enter the slot 23, the members may be locked together and placed on the finger as a unit.

It is of course possible to omit either of the members 11 and 12 from the ensemble, the advantages of the invention as applied to a three-member ensemble, namely, the promotion of the comfort of the wearer and the improvement in appearance of the ornament, being secured. Again, as shown more particularly in Figure 7, it is possible to reverse one of the two outer members of the ensemble and omit the central ornamented or jeweled member, the arcuate portions of these outer members being preferably formed so as to fit snugly together by slightly increasing the width thereof with respect to the width of the shank portions. In the event it is desired to lock these members against rotation and axial displacement, each may be formed to provide a small recess 25 at one side of the arcuate portion of the member, this recess conforming in shape to and being adapted to receive the projection 22 at the other side of the other member.

While the invention is applicable to other ornaments, for instance, bracelets, it is of principal value when applied to finger rings, and particularly to engagement and wedding ring ensembles in which it is common to form the engagement ring as a solitaire and the wedding ring as a plain or ornamented band of generally uniform width measured axially. The third member of the ensemble as illustrated in the drawing may constitute a guard ring and is preferably of the same shape and size of the wedding ring, being distinguished therefrom by the use of different stones or ornamentation. Any of the three rings or any two of them may be sold and worn separately with pleasing effect and comfort to the wearer and may thus be acquired one at a time or purchased in a complete set. For example, in the wedding ensemble, the engagement ring or solitaire may be purchased first, the wedding ring added when the ceremony takes place, and the guard ring acquired at a still later date, the configuration of the rings being such that regardless of which members are present, the absence of the remaining members does not detract from the appearance of the ornament.

While I have described the form of the invention shown in the drawing with particularity in order to facilitate an understanding of the invention, it will nevertheless be appreciated that various modifications of the illustrated structure are contemplated, such as may fall within the spirit and scope of the appended claim.

Having thus described the invention, what is claimed as new and desired to be secured by Letters Patent is:

An ornament ensemble comprising three annular members adapted to be worn in axial alignment and in contiguous relation, one of said members having an enlarged ornamented portion, the remaining two members being of similar configuration and each comprising a curved portion distorted laterally of the plane containing the major portion thereof, the curvature of such distorted portion conforming substantially to the lateral contour of the enlarged ornamented portion of said first-named member, whereby said second named members may each be located on opposite sides only of said first-named member and may receive and together completely embrace the enlarged ornamented portion of the latter, and whereby said last named members may be worn as a complete ensemble by disposing the same in contiguous relation with the curved portions thereof interfitting.

OLIVE von DACHENHAUSEN.